United States Patent
Dry et al.

(10) Patent No.: US 11,203,248 B2
(45) Date of Patent: Dec. 21, 2021

(54) VEHICLE SEAT WITH COOLING FLUIDFLOW

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Marcos Silva Kondrad, Macomb Township, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/036,771

(22) Filed: Sep. 29, 2020

(65) Prior Publication Data
US 2021/0008955 A1    Jan. 14, 2021

Related U.S. Application Data

(62) Division of application No. 15/689,314, filed on Aug. 29, 2017, now Pat. No. 10,821,803.

(51) Int. Cl.
*B60H 1/00* (2006.01)
*B60N 2/56* (2006.01)

(52) U.S. Cl.
CPC ....... *B60H 1/00285* (2013.01); *B60N 2/5607* (2013.01); *B60N 2/5635* (2013.01); *B60N 2/5657* (2013.01); *B60N 2/5692* (2013.01); *B60H 2001/00307* (2013.01)

(58) Field of Classification Search
CPC .............. B60H 1/00285; B60N 2/5607; B60N 2/5635; B60N 2/5657; B60N 2/5692
See application file for complete search history.

(56) References Cited

U.S. PATENT DOCUMENTS

| 3,030,145 A | 4/1962 | Kottemann |
| 3,165,620 A | 1/1965 | Miller |
| 5,921,858 A | 7/1999 | Kawai et al. |
| 5,927,817 A | 7/1999 | Ekman et al. |
| 6,048,024 A | 4/2000 | Wallman |
| 6,119,463 A | 9/2000 | Bell |
| 6,478,369 B1 | 11/2002 | Aoki et al. |
| 6,541,737 B1 | 4/2003 | Eksin et al. |

(Continued)

FOREIGN PATENT DOCUMENTS

EP    1723876 A1    11/2006

OTHER PUBLICATIONS

Elarusi, Abdulmunaem H., "Optimal Design of a Thermoelectric Cooling/Heating System for Car Seat Climate Control (CSCC)" 2016, Master's Theses, 720, Western Michigan University, ScholarWorks at WMU.

*Primary Examiner* — Anthony D Barfield
(74) *Attorney, Agent, or Firm* — David Coppiellie; Price Heneveld LLP

(57) ABSTRACT

A seating assembly includes a seating surface extending over at least one of a seat and a seatback. The seating assembly also includes a fluid mover and a fluid transfer member including a fluid inlet portion and a fluid outlet portion. The fluid inlet portion is coupled to the fluid mover, and the fluid outlet portion is proximate the seating surface. The fluid mover is selectively operable to release a pressurized fluid through the tube so that the release of the pressurized fluid at the outlet cools a seating assembly occupant.

7 Claims, 16 Drawing Sheets

(56) References Cited

U.S. PATENT DOCUMENTS

| | | | |
|---|---|---|---|
| 7,475,464 B2 | 1/2009 | Lofy et al. | |
| 7,828,050 B2 | 11/2010 | Esaki | |
| 7,877,827 B2 | 2/2011 | Marquette et al. | |
| 8,702,164 B2 | 4/2014 | Lazanja et al. | |
| 8,998,311 B2 | 4/2015 | Axakov et al. | |
| 9,310,112 B2 | 4/2016 | Bell et al. | |
| 9,403,460 B2 | 8/2016 | Hickey et al. | |
| 9,468,045 B2 | 10/2016 | Zhang et al. | |
| 9,676,310 B2 | 6/2017 | Fitzpatrick et al. | |
| 10,252,652 B2 | 4/2019 | Dry et al. | |
| 10,507,745 B2 | 12/2019 | Dry et al. | |
| 2006/0060344 A1 | 3/2006 | Esaki | |
| 2006/0138812 A1 | 6/2006 | Aoki | |
| 2006/0208540 A1 | 9/2006 | Lofy et al. | |
| 2007/0188007 A1 | 8/2007 | Lazanja et al. | |
| 2010/0066133 A1 | 3/2010 | Benton | |
| 2010/0209230 A1 | 8/2010 | Eckel | |
| 2010/0327637 A1 | 12/2010 | Bajic et al. | |
| 2015/0266405 A1 | 9/2015 | Fitzpatrick et al. | |
| 2015/0274049 A1 | 10/2015 | Langensiepen et al. | |
| 2015/0329027 A1 | 11/2015 | Axakov | |
| 2016/0137110 A1 | 5/2016 | Lofy et al. | |
| 2016/0332549 A1 | 11/2016 | Marquette et al. | |
| 2017/0240078 A1 | 8/2017 | Ishii et al. | |
| 2018/0020838 A1 | 1/2018 | Ishii et al. | |

VEHICLE SEAT WITH COOLING FLUIDFLOW

CROSS-REFERENCE TO RELATED APPLICATIONS

This patent application is a division of U.S. patent application Ser. No. 15/689,314, which was filed on Aug. 29, 2017, entitled VEHICLE SEAT WITH COOLING FLUID-FLOW, now U.S. Pat. No. 10,821,803, the entire disclosure of which is hereby incorporated herein by reference.

FIELD OF THE INVENTION

The present disclosure generally relates to a vehicle seating assembly, and more particularly to a vehicle seating assembly having a cooling fluid flow.

BACKGROUND OF THE DISCLOSURE

Vehicle seat comfort has become increasingly important as passengers take longer trips. Providing cooling from the seat can increase the comfort of passengers.

A variety of vehicle seating assemblies that provide for occupant cooling are known. However, current solutions for providing cooled air often can be inadequate for cooling a seated passenger. Further, current solutions for providing cooled air may not cool the occupant efficiently.

SUMMARY OF THE DISCLOSURE

According to one aspect of the present disclosure, a seating assembly includes a seating surface extending over at least one of a seat and a seatback, a fluid mover, and a fluid transfer member comprising a fluid inlet portion and a fluid outlet portion. The fluid inlet portion is coupled to the fluid mover, and the fluid outlet portion is proximate the seating surface. The fluid mover is selectively operable to direct a pressurized fluid through the fluid transfer member to deliver a cooling effect at the fluid outlet portion to cool an occupant.

Aspects of the first aspect of the disclosure can include any one or a combination of the following features:
  the fluid transfer member comprises a tube;
  the fluid transfer member comprises a tube and wherein the tube comprises a first aperture and a second aperture and wherein a holder is coupled to the second aperture;
  a holder is configured to support a trim cover; and/or
  the fluid transfer member comprises a trim cover having extruded fluid galleries and wherein the cooling effect is achieved by an adiabatic process or a Joule-Thomson effect.

According to another aspect of the present disclosure, a vehicle seating assembly includes a seating surface and a tube arranged proximate the seating surface. The tube has an inlet fluidly coupled with a fluid mover and an outlet proximate the seating surface. The fluid mover is selectively operable to release a pressurized fluid through the tube so that the release of the pressurized fluid at the outlet cools an occupant.

Aspects of the second aspect of the disclosure can include any one or a combination of the following features:
  an adiabatic temperature reduction at the outlet cools the seating assembly occupant;
  the tube comprises a plurality of galleries;
  the plurality of galleries is integral to a seat trim cover proximate the seating surface;
  a holder proximate the seating surface;
  the outlet of the tube is coupled to the holder and the pressurized fluid travels from the outlet to the holder;
  a cap having one or more openings wherein the cap is coupled to the holder and the pressurized fluid travels through the one or more openings to cool the seating assembly occupant;
  the holder is puck shaped;
  the holder is rigid;
  the cap includes at least one of a mesh or a grating;
  the seating surface extends over a seat and wherein the inlet is at a downward facing portion of the seat and the outlet is at an upward facing portion of the seat;
  the seating surface extends over a seatback and wherein the inlet is at a rearward facing portion of the seatback and the outlet is at a forward facing portion of the seatback; and/or
  the fluid mover is a compressor.

According to another aspect of the present disclosure, the seating assembly includes a seat including a seat surface and a seatback including a seatback surface. The seatback is coupled to the seat. The seating assembly includes a tube having an inlet and an outlet wherein the outlet is proximate at least one of the seat surface and the seatback surface. The seating assembly also includes a holder coupled to the tube. A fluid mover is coupled to the inlet and selectively operable to release a pressurized fluid through the tube and into the holder to cool an occupant.

Aspects of the third aspect of the disclosure can include any one or a combination of the following features:
  the outlet is one of a plurality of outlets along a length of the tube wherein the holder comprises two orifices and wherein the tube transverses the holder and extends through the two orifices and wherein at least one outlet releases the pressurized fluid into the holder to cool an occupant; and/or
  the holder is one of a plurality of holders arranged along the tube in a sleeve-like configuration and wherein the outlet is one of a plurality of outlets along the tube and wherein each holder contains an outlet that releases pressurized fluid to cool the occupant.

These and other aspects, objects, and features of the present disclosure will be understood and appreciated by those skilled in the art upon studying the following specification, claims, and appended drawings.

DETAILED DESCRIPTION

Figure 1:
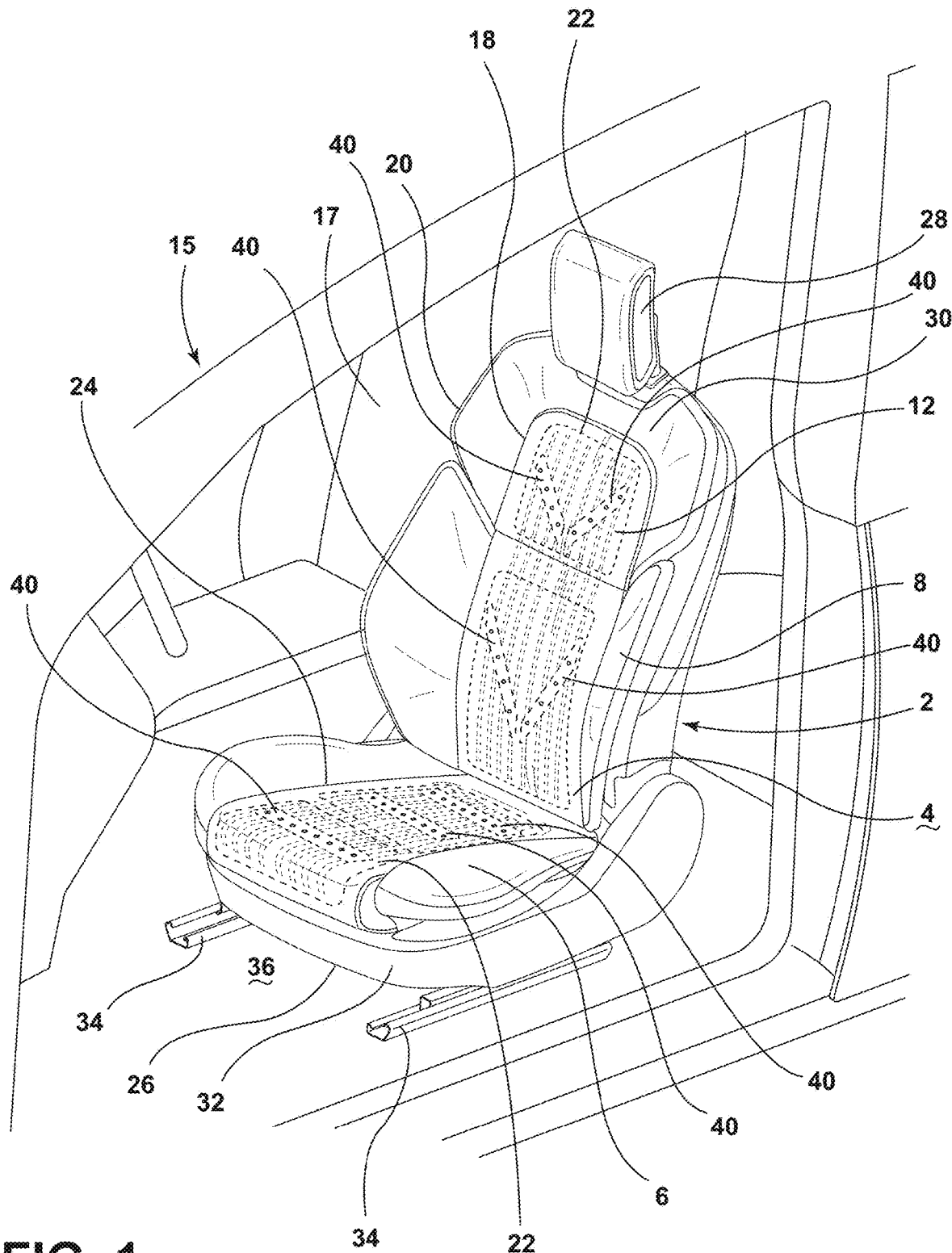
FIG. 1 is a side perspective view of the seating assembly in a vehicle of an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

Referring to FIGS. 1-17, a seating assembly 2 includes a seating surface 4 that extends over at least one of a seat 6 and a seatback 8. The seating assembly 2 also includes a fluid mover 10 and a fluid transfer member 12. The fluid transfer member 12 comprises a fluid inlet portion 14 and a fluid outlet portion 16. The fluid inlet portion 14 is coupled to the fluid mover 10, and the fluid outlet portion 16 is proximate the seating surface 4. The fluid mover 10 is selectively operable to direct pressurized fluid through the fluid transfer member 12 to deliver a cooling effect at the fluid outlet portion 16 to cool the seating assembly 2 occupant.

Referring to FIG. 1, the seating assembly 2 is illustrated inside a cabin 17 of a vehicle 15. The seating assembly 2 may be a seat for a driver, a seat for a passenger, a rear bucket seat, a rear row of seats or any other vehicle seat. The seating assembly 2 includes a seat 6 and a seatback 8 pivotably attached to the seat 6. The seatback 8 of the seating assembly 2 includes a forward facing portion 18 and a rearward facing portion 20. In various aspects, a trim cover 22 covers the forward facing portion 18. The seat 6 of the seating assembly 2 includes an upward facing portion 24 and a downward facing portion 26. In various aspects, a trim cover 22 covers the upward facing portion 24. The seating assembly 2 also includes a headrest 28 operably coupled to an upper portion 30 of the seatback 8. The seating assembly 2 also typically includes a seat base 32 configured to provide structural support to the seating assembly 2. The seat base 32 is preferably supported on seat mounting rail assemblies 34. The seat mounting rail assemblies 34 are configured to allow the seating assembly 2 to be adjusted in forward and rearward directions relative to the longitudinal axis of the vehicle 15. The seating assembly 2 is slidably coupled with a floor 36. It is also conceivable that the seating assembly 2 may not include the seat mounting rail assemblies 34 and alternatively may be fixedly coupled with the floor 36 of the vehicle 15.

In certain conditions, when temperature and atmospheric conditions are outside of an occupant's comfort range, the seat 6 and the seatback 8 may be uncomfortably warm such that the seating assembly 2 may not provide the occupant with comfortable transit in a vehicle. Accordingly, a cooling effect is achieved at cooling zones 40 as generally set forth in FIGS. 1-17 with the release of pressurized air jets 41 that cool the occupant's skin and penetrate the occupant's clothing, thus providing for a more pleasant traveling experience for the occupant.

Figure 2:
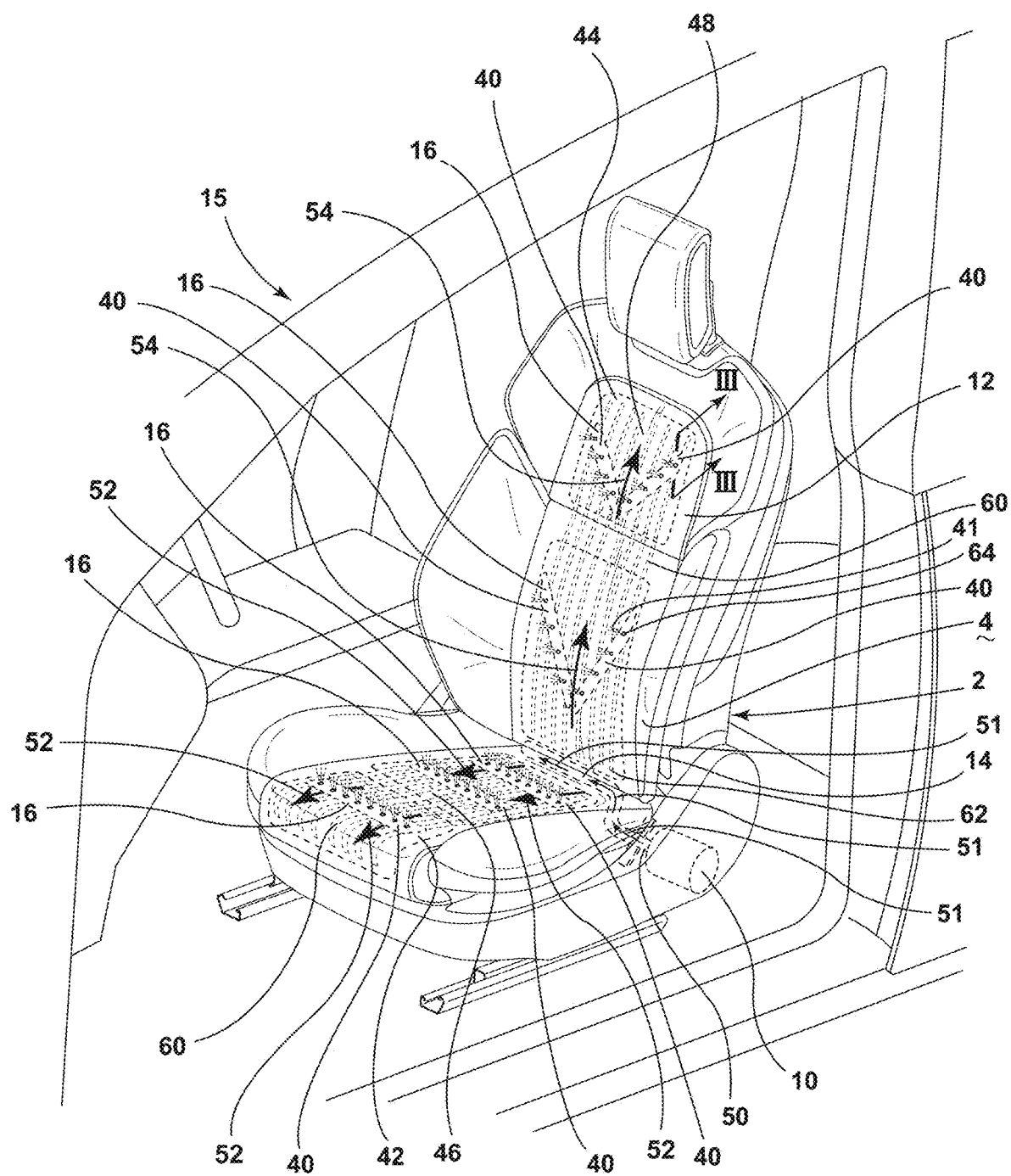
FIG. 2 is a side perspective view of the seating assembly with fluid flow directions and a fluid mover of an aspect of the present disclosure.

Referring to FIG. 2, the fluid transfer member 12 may include a first portion 42 and a second portion 44. The seating surface 4 includes a seat surface 46 and a seatback surface 48. In the depicted aspect, the fluid transfer member first portion 42 is proximate the seat surface 46. The fluid transfer member second portion 44 is proximate the seatback surface 48. The fluid transfer member first portion 42 and the fluid transfer member second portion 44 are in communication with the fluid mover 10. The fluid mover 10 pushes pressurized fluid through a fluid passageway 50 and into the fluid inlet portion 14 of the fluid transfer member 12. Arrows 51 show fluid flow from the fluid mover 10 through the fluid passageway 50. Arrows 52 and 54 show fluid flow in the fluid transfer member first portion 42 and the fluid transfer member second portion 44, respectively. The pressurized fluid leaves the fluid transfer member first portion 42 and the fluid transfer member second portion 44 at the fluid outlet portions 16.

Figure 3:
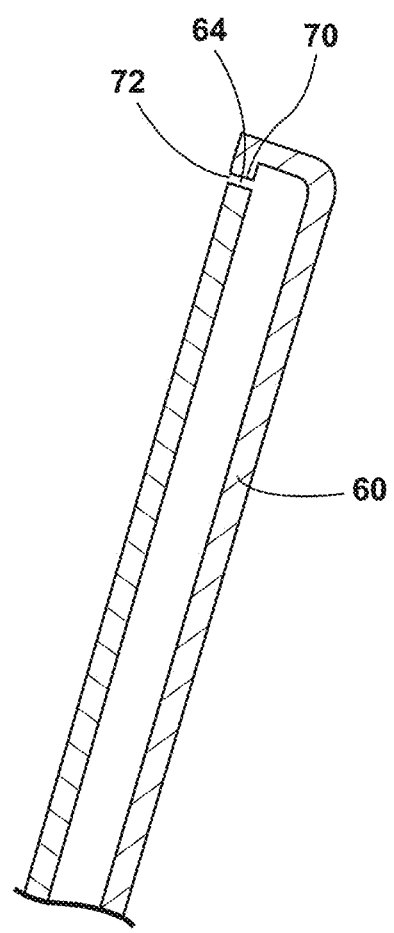
FIG. 3 is a cross-sectional view of a tube of FIG. 2 taken along line III-III of FIG. 2.

With reference again to FIGS. 2 and 5, in various aspects, the fluid transfer member 12 may include one or more tubes 60. In the depicted aspect, the fluid transfer member first portion 42 and the fluid transfer member second portion 44 include one or more tubes 60. In various aspects of the present disclosure, the tubes 60 typically have a first aperture 62 and a second aperture 64. In various aspects of the disclosure, the first aperture 62 is typically an inlet aperture that is in communication with the fluid mover 10. Referring to FIG. 3, in various aspects of the present disclosure, the second aperture 64 is typically an outlet aperture 70 that has a release point 72 of the pressurized fluid that exits the tubes 60 to cool the seating assembly 2 occupant. Referring to FIGS. 6 and 15-17, in various aspects of the disclosure, a tube 60 (or gallery 98 or conduit 160) may include additional outlet apertures 70 (or gallery outlet portions 102 or conduit outlets 178) including at least a third aperture 66, and/or a fourth aperture 68. Referring to FIGS. 2-3, the outlet aperture 70 is typically a metered vent. In various aspects, the metered vent may have a diameter of approximately 0.2 mm to approximately 0.6 mm. To achieve greater or lesser fluid pressure through the metered vent, the fluid mover 10 works more or less. The outlet apertures 70 are arranged in cooling zones 40 suitable for an occupant's cooling physiology. Referring to FIGS. 13-14 and 16-17, in various aspects, a perforated trim cover 22 is between the occupant and the fluid transfer member 12. In various aspects, a permeable topper pad 173 is between the trim cover 22 and the fluid transfer member 12.

Referring to FIGS. 1-17, in various aspects, an adiabatic process utilizing a fluid mover 10 that is a compressor and the fluid transfer member 12 achieves pressurized air at outlet apertures 70 that typically penetrates the permeable topper pad 173, the perforated trim cover 22, and an occupant's clothing to cool the occupant's skin. In thermodynamics, the adiabatic process for ideal gases stands for no transfer of heat or matter out of a system (Q=0). The adiabatic process for an ideal gas is isothermal. However, for air at ambient temperatures, adiabatic compression of a gas causes a rise in the temperature of the gas. Adiabatic expansion against pressure, for example a spring or a metered vent, causes a drop in temperature. In various aspects of the disclosure, the fluid is air or a gas that behaves like air in typical vehicle conditions at ambient temperature. The pressure drop at the point of ambient air release (the release point 72) typically causes an adiabatic temperature reduction.

In various aspects of the disclosure, the fluid mover 10 is a compressor that provides pressurized ambient air to the fluid transfer member 12. The compressor may provide pressurized ambient air with pressure that is approximately 150 times higher than the pressurized ambient air that a typical vehicle seating assembly air mover provides. For example, according to various aspects, a typical pressure of a vehicle seat fan may be approximately 0.066 psi. In various aspects, the pressure that a typical compressor generates may be approximately 10.0 psi, which is approximately 150 times higher than 0.066 psi. The increased air pressure of the compressor has numerous advantages over the air pressure generated by a typical vehicle seating assembly air mover. The increased air pressure of the compressor allows a thinner and more flexible fluid transfer member 12 to be used in the seating assembly 2. The increased air pressure of the compressor provides usable residual air pressure at the outlet aperture 70 to purge warm moist air from the clothing of the occupant. The pressure drop at the outlet apertures 70 of the fluid transfer member 12 provides a lower temperature that cools the occupant while providing enough pressure to penetrate the occupant's clothing.

Figure 4:
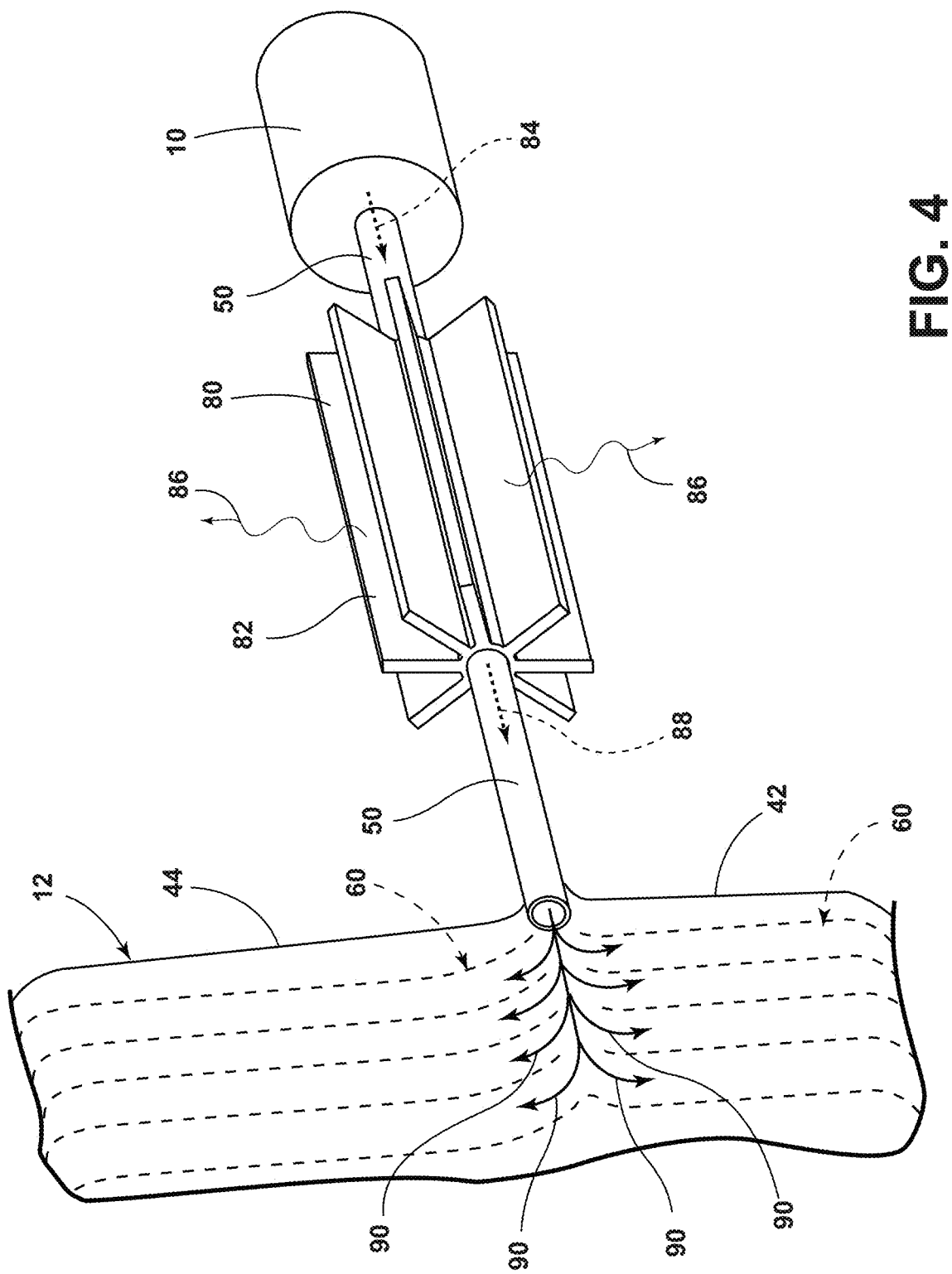
FIG. 4 is a perspective view of a radiator coupled to a fluid passageway emanating from a fluid mover of an aspect of the present disclosure.

Referring to FIG. 4, in various aspects a radiator 80 or other heat dissipation member (cooler) may be used to dissipate heat from the compressed fluid that may enter the compressed fluid due to work from the fluid mover 10. The fluid mover 10 is coupled to fluid passageway 50. In the depicted aspect, a plurality of fins 82 emanates from the radiator 80. In the depicted aspect, air depicted by arrow 84 leaves the fluid mover 10 and enters the radiator 80. The radiator 80 absorbs heat from the air traveling through the radiator 80. Heat leaves the radiator 80 in the direction of arrows 86. Air exits the radiator 80 at arrow 88. Typically, the air that exits the radiator 80 at arrow 88 has a lower temperature than the air that enters the radiator 80 at arrow 84. The radiator 80 typically increases the efficiency of the adiabatic process by removing heat from the air before it enters the fluid transfer member 12.

The Joule-Thompson Effect may also be used to achieve cooling at the release points 72 of the pressurized air. In thermodynamics, the Joule-Thompson Effect describes the temperature change of a real gas or liquid (as differentiated from an idea gas) when it is forced through a valve or porous plug while it is kept insulated so that no heat is exchanged with the environment. At room temperature, air cools upon expansion by the Joule-Thompson Effect. The Joule-Thompson Effect may be observed during the throttling process. With reference to FIG. 4, a radiator 80 typically increases the efficiency of the Joule-Thompson Effect by removing heat from the air before it enters the fluid transfer member 12.

By way of example, in various aspects, an air supply of approximately 25 psig is contained in a fluid transfer member 12. The air supply releases air beneath the occupant. The seating surface 4 will experience a temperature drop. The temperature drop occurs directly and at the pressure release point 72 as the pressurized air is at ambient temperature. Typically, minimal insulation is required, and typically there is little loss of cooling capacity.

In various aspects, the temperature of the pressurized air leaving outlet apertures 70 may be as low as approximately 5.0 degrees Celsius (41 degrees Fahrenheit). In various aspects, the seating surface 4 may experience a temperature drop of approximately 15.5 degrees Celsius (60 degrees Fahrenheit) to approximately 5.0 degrees Celsius (41 degrees Fahrenheit).

Figure 5:
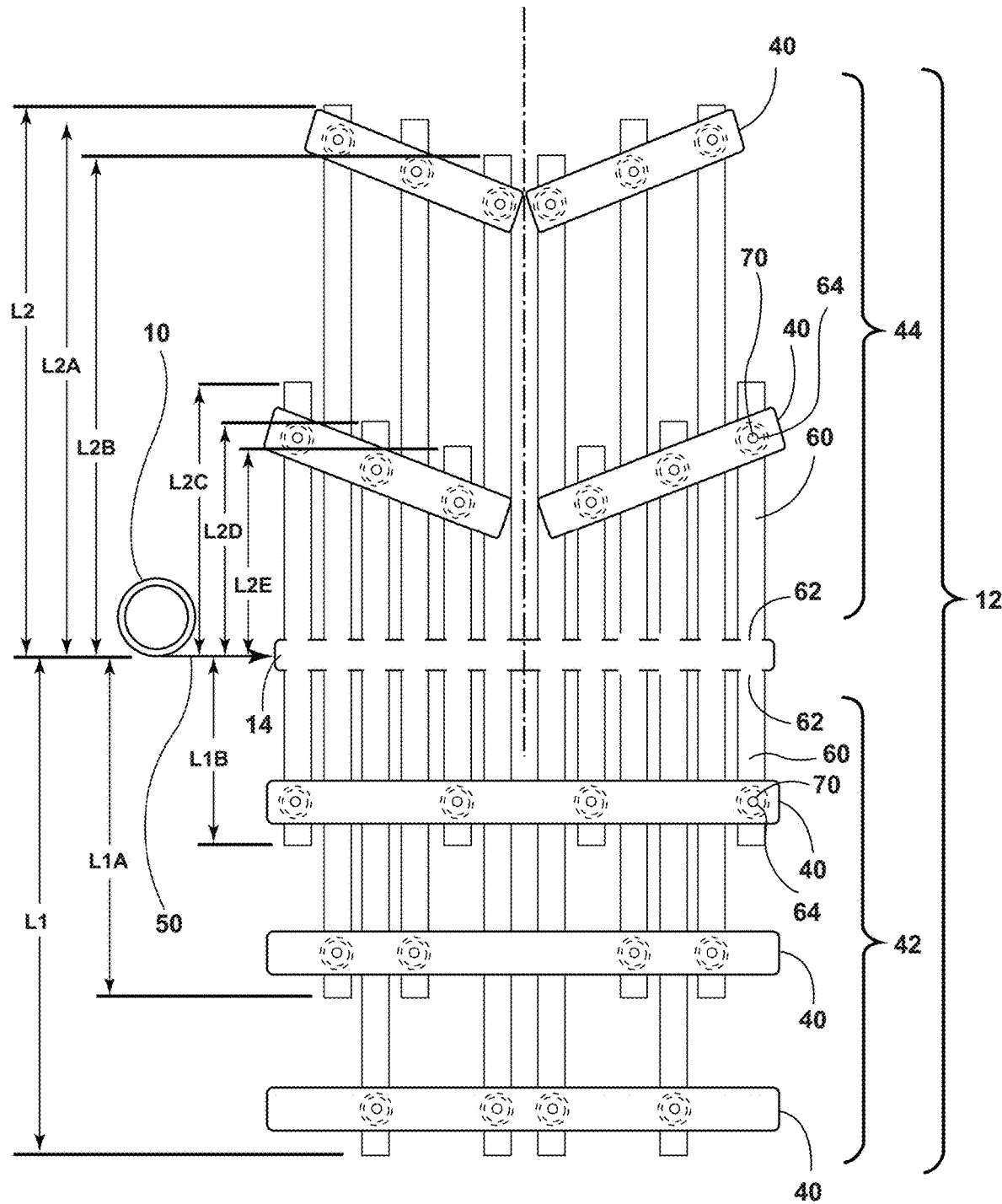
FIG. 5 is a schematic representation of the fluid transfer member with a fluid mover of an aspect of the present disclosure.

With regard to FIG. 5, a schematic representation of the general layout of the tubes 60 of the fluid transfer member 12 is shown. The fluid transfer member first portion 42 and the fluid transfer member second portion 44 are in communication with the fluid mover 10. A fluid passageway 50 delivers fluid from the fluid mover 10 to the fluid transfer member 12 inlet portion 14. Tube outlets 70 are located at the ends of the tubes 60. The tube 60 lengths ($L_1$, $L_{1A}$, $L_{1B}$, $L_2$, $L_{2A}$, $L_{2B}$, $L_{2C}$, $L_{2D}$, $L_{2E}$, etc.) generally represent approximate distances from the tube 60 first (inlet) aperture 62 to the tube outlet aperture 70 (second aperture 64) to arrange release of cool air according to an occupant's physiology at targeted cooling zones 40. In various aspects, numerous tubes 60 are present in a fluid transfer member 12. In various aspects, scores of tubes 60 are present in a fluid transfer member 12. In various aspects, more than a hundred tubes 60 are present in a fluid transfer member 12.

Figure 6:
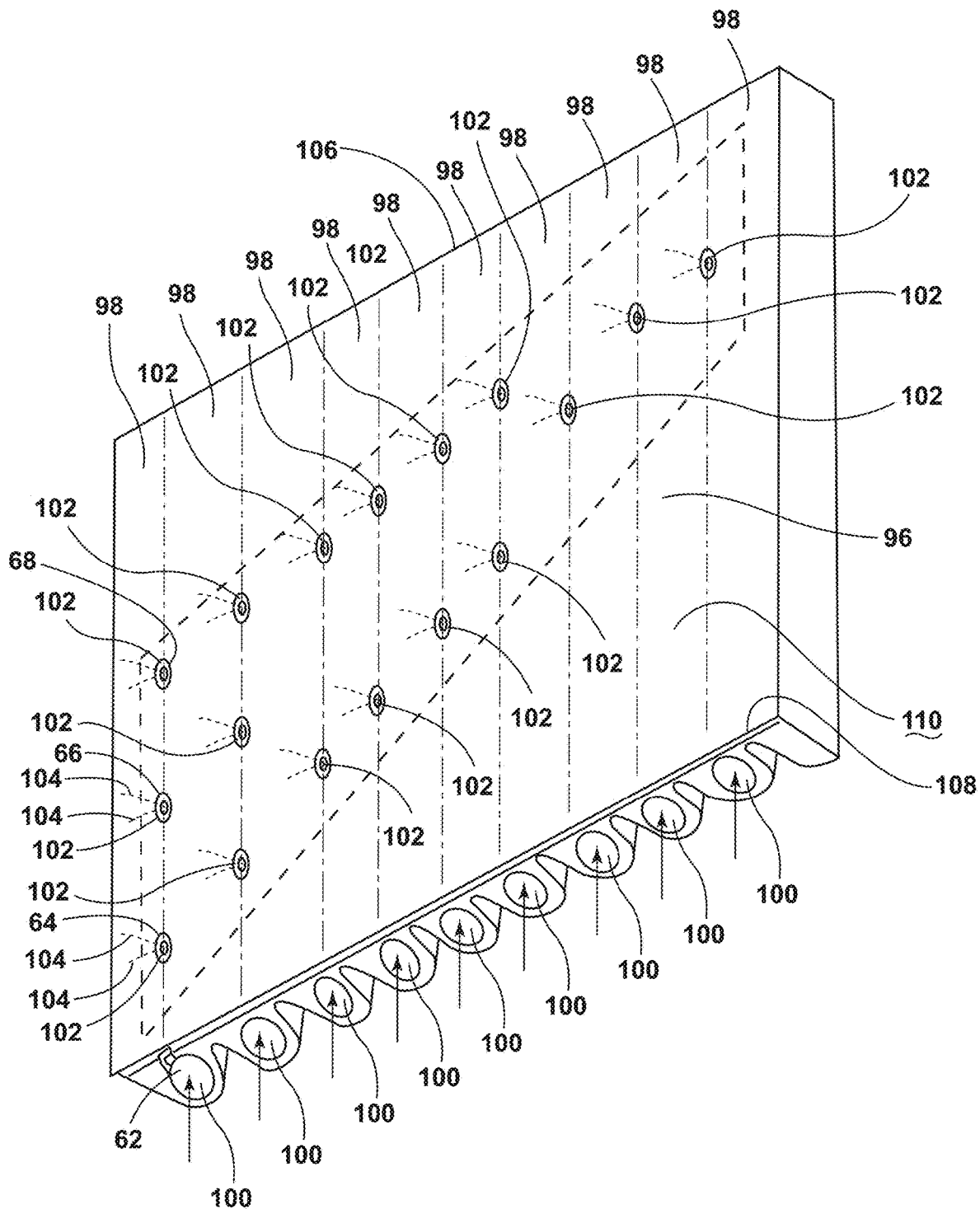
FIG. 6 is a perspective view of a section of a fluid transfer member that is a seat trim cover having extruded fluid galleries of an aspect of the disclosure.

Referring to FIG. 6, in various aspects, the fluid transfer member 12 may be a trim cover panel 96 having extruded fluid galleries 98. A portion of a trim cover panel 96 with extruded fluid galleries 98 is depicted in FIG. 6. The fluid galleries 98 have inlet portions 100 that are in communication with a fluid mover 10. The fluid galleries 98 have outlet portions 102 that are located proximate the seating surface 4. In the depicted aspect, the outlet portions 102 are metered holes. In various aspects, the fluid mover 10 is a compressor and the fluid is air. In various aspects, pressurized air is routed from the compressor, through the fluid galleries 98 of the trim cover panel 96, and out of the fluid outlet portions 102. In the depicted aspect, each fluid gallery 98 may have a gallery entry at inlet portion 100 and one or more gallery exits at outlet portions 102. In various aspects, the outlet portions 102 are fine diameter exit jets 104 with a high pressure drop upon exit of pressurized air from the outlet portions 102. In the depicted aspect, the top edge 106 of trim cover panel 96 is sealed. In the depicted aspect, a cover stock 108 is bonded to the panel's A-surface 110. In various aspects, the trim cover panel 96 is an extruded soft and flexible air distribution panel. The pressurized air exit jets 104 cool an occupant.

Figure 7:
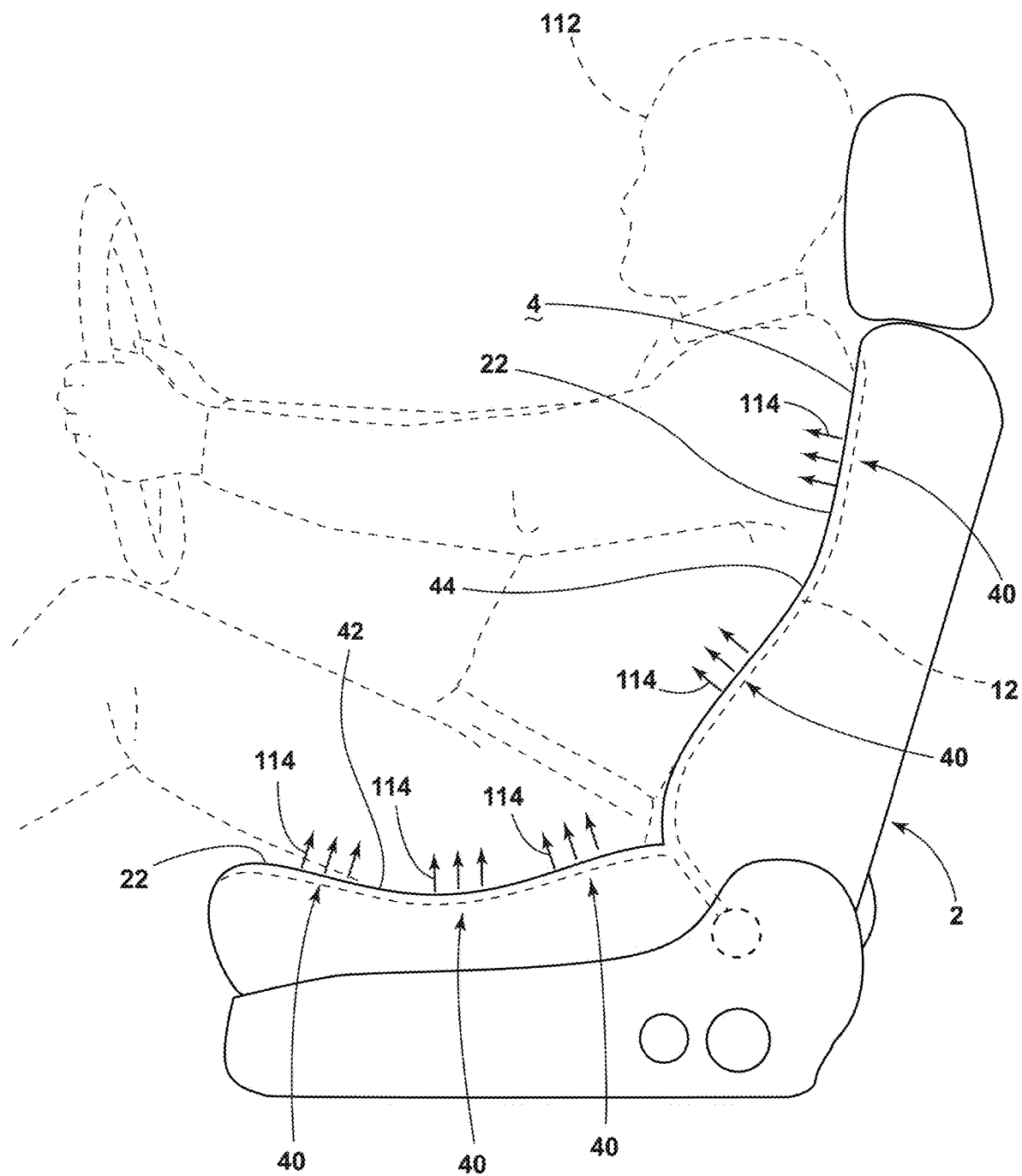
FIG. 7 is a side elevational view of the seating assembly with fluid transfer member and fluid mover of an aspect of the present disclosure.

FIG. 7 is a side elevational view of the seating assembly 2. The fluid transfer member 12 is at the seating surface 4. The fluid transfer member first portion 42 is proximate the seat surface 46. The fluid transfer member second portion 44 is proximate the seatback surface 48. The occupant 112 sits in the seating assembly 2. Pressurized air at arrows 114 cools the occupant's back, buttocks, and legs at various cooling zones 40. The pressurized air at arrows 114 typically moves from the release point 72 directly through the trim cover 22, which may be perforated or porous in various aspects, and typically cools the occupant 112 by dropping the temperature of the air at arrows 114 while typically retaining residual pressure to infiltrate the clothing of an occupant until the skin of an occupant is reached. In various aspects, a chilled air supply at arrows 114 is typically brought directly into contact with the occupant's skin to cool the clothed occupant 112 quickly and strongly. In various aspects, adiabatic cooling for ambient air or the Joule Thomson Process for ambient air, is used to chill the fluid at arrows 114 released immediately beneath the trim cover 22 enabling its residual pressure to infiltrate clothing.

Figure 8:
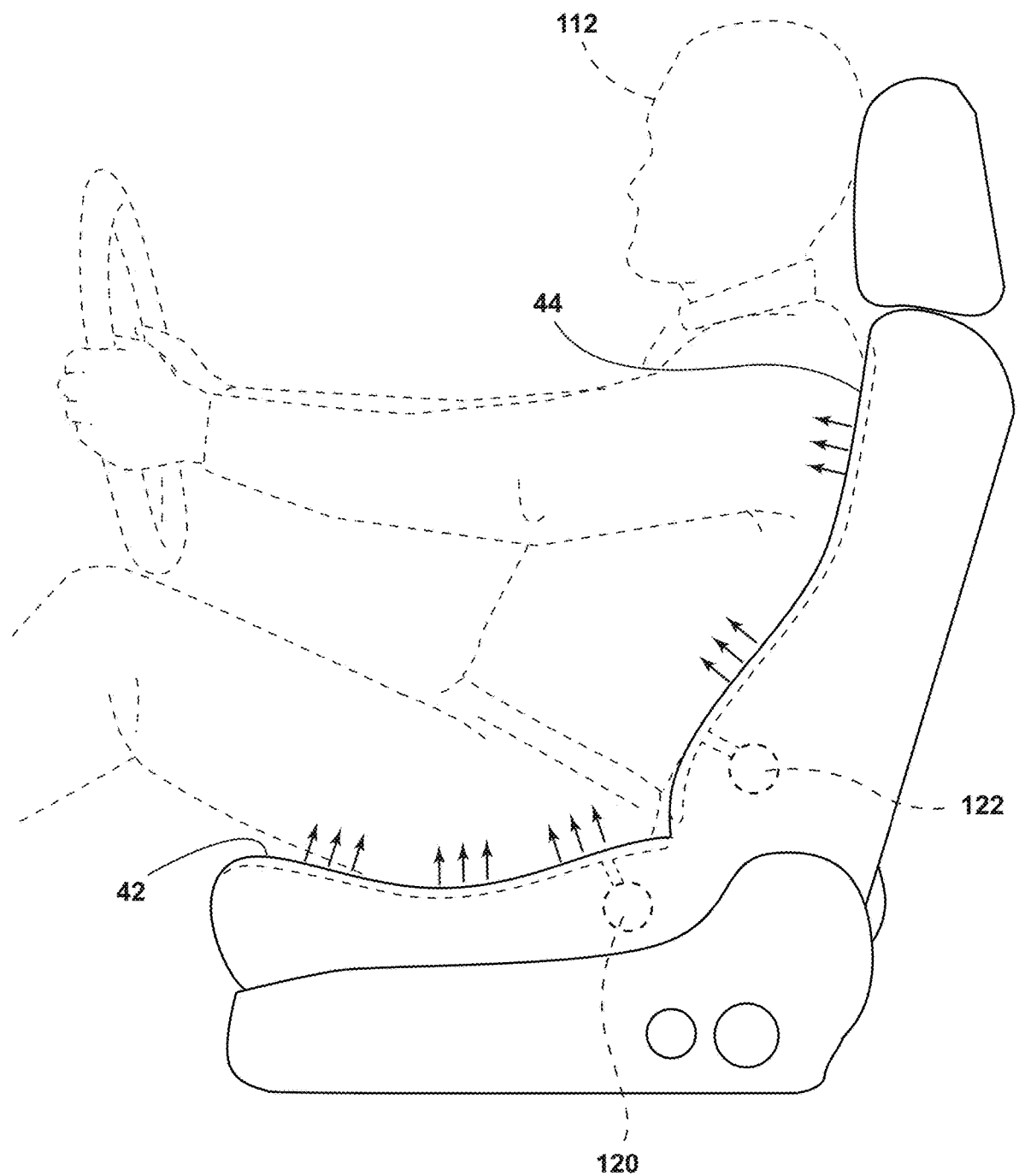
FIG. 8 is a side elevational view of the seating assembly with a fluid transfer member first portion and a fluid transfer member second portion and a first compressor and a second compressor of an aspect of the disclosure.

Referring to FIG. 8, an aspect of the disclosure utilizes a first compressor 120 to deliver fluid to the fluid transfer member first portion 42 and a second compressor 122 to deliver fluid to the fluid transfer member second portion 44.

Figure 9:
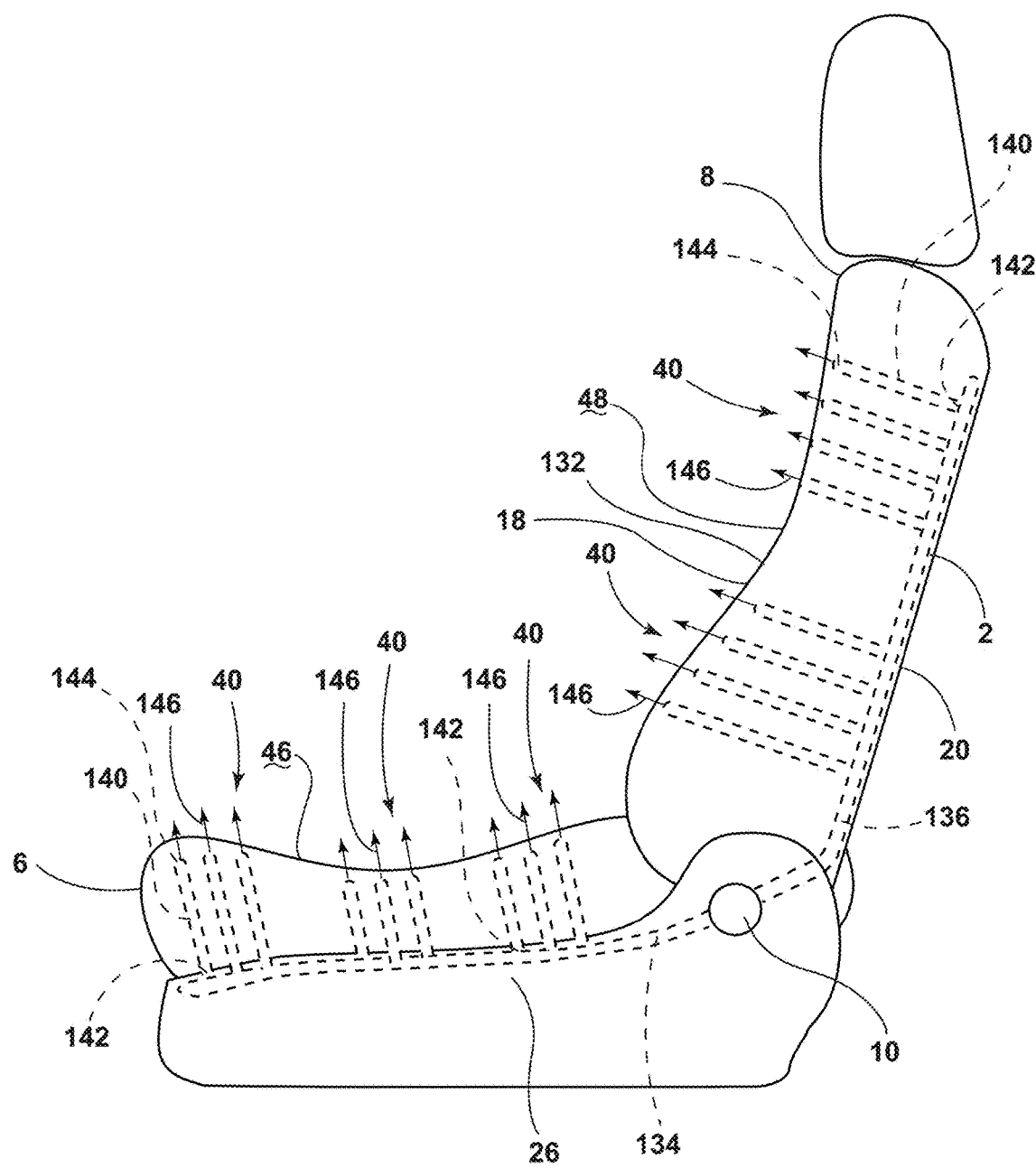
FIG. 9 is a side elevational view of the seating assembly with fluid transfer member and fluid mover of an aspect of the disclosure.

Referring to FIG. 9, a seating assembly 2 includes a seat surface 46 and a seatback surface 48. The fluid mover 10 directs fluid into a first fluid passageway 134 that is located proximate the downward facing portion 26 of the seat 6. In various aspects, the first fluid passageway 134 may be a plenum. With reference to the seat 6, channels 140 emanate from the first fluid passageway 134. Channel inlets 142 are coupled to the first fluid passageway 134. Channel outlets 144 are proximate to the seat surface 46. With reference to the seatback 8, a second fluid passageway 136 emanates from the fluid mover 10. The second fluid passageway 136 is located proximate the rearward facing portion 20 of the seatback 8. With reference to seatback 8, the channels 140 extend from the rearward facing portion 20 to the forward facing portion 18. The channel inlets 142 are coupled to the second fluid passageway 136. The channel outlets 144 are located proximate the seatback surface 48. Arrows 146 depict the flow of pressurized air at cooling zones 40.

Figure 11:
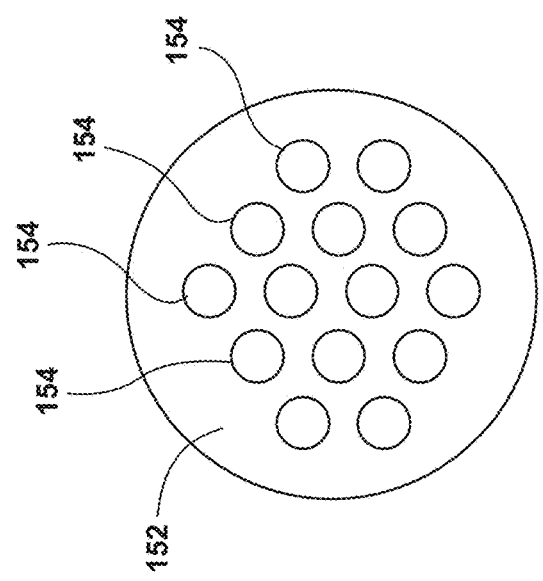
FIG. 11 is an elevational view of the cover of an aspect of the present disclosure.
Figure 11B:
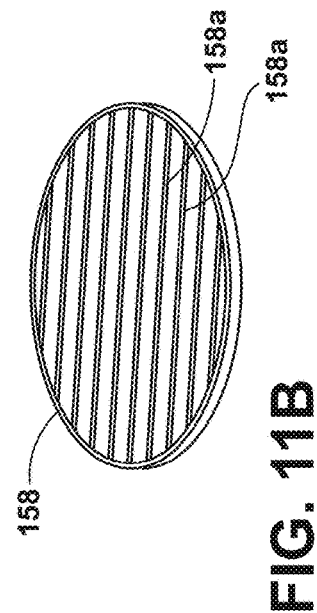
FIG. 11B is a perspective view of a cover according to another aspect of the present disclosure.
Figure 10:
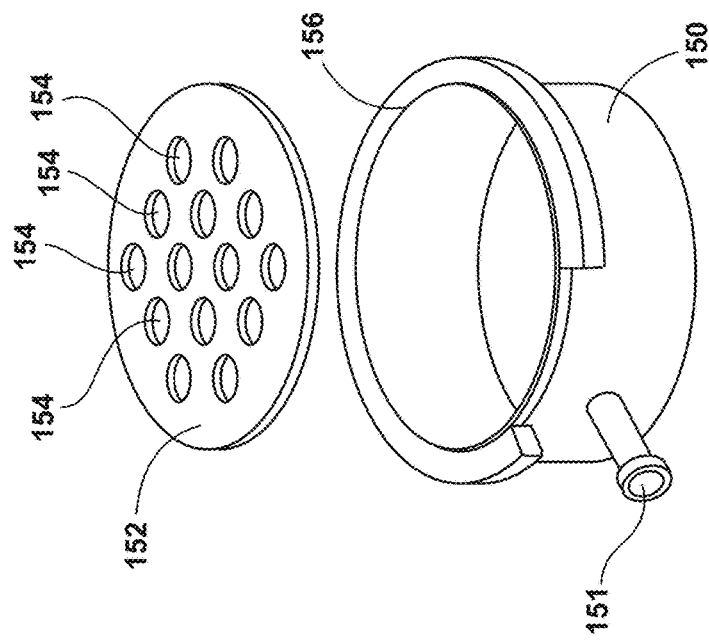
FIG. 10 is a perspective view of a holder and a cover of an aspect of the present disclosure.
Figure 11A:
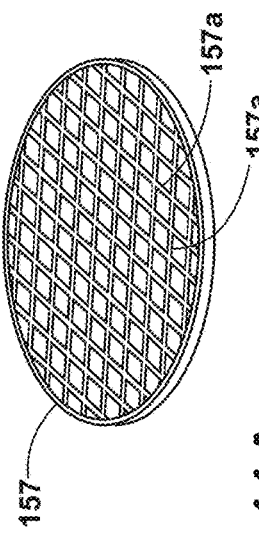
FIG. 11A is a perspective view of a cover according to another aspect of the present disclosure.

Referring to FIGS. 10-17, in various aspects of the disclosure, a holder 150 within the fluid transfer member 12 directs the fluid to the occupant. With reference to FIG. 11, a cap 152 is coupled to the holder 150. In the depicted aspect, the cap 152 has a plurality of openings 154. In various aspects, the cap 152 is gridded and snaps onto the holder 150 pressure cooling outlet 156 to support the trim cover 22. In various aspects, the holder 150 is puck shaped. In various aspects, the holder 150 is rigid. With reference to FIG. 11A, in various aspects, a cap 157 has a mesh of crisscrossed bars 157a. Referring to FIG. 11B, in various aspects, a cap 158 has a grating of substantially parallel bars 158a.

Figure 12:
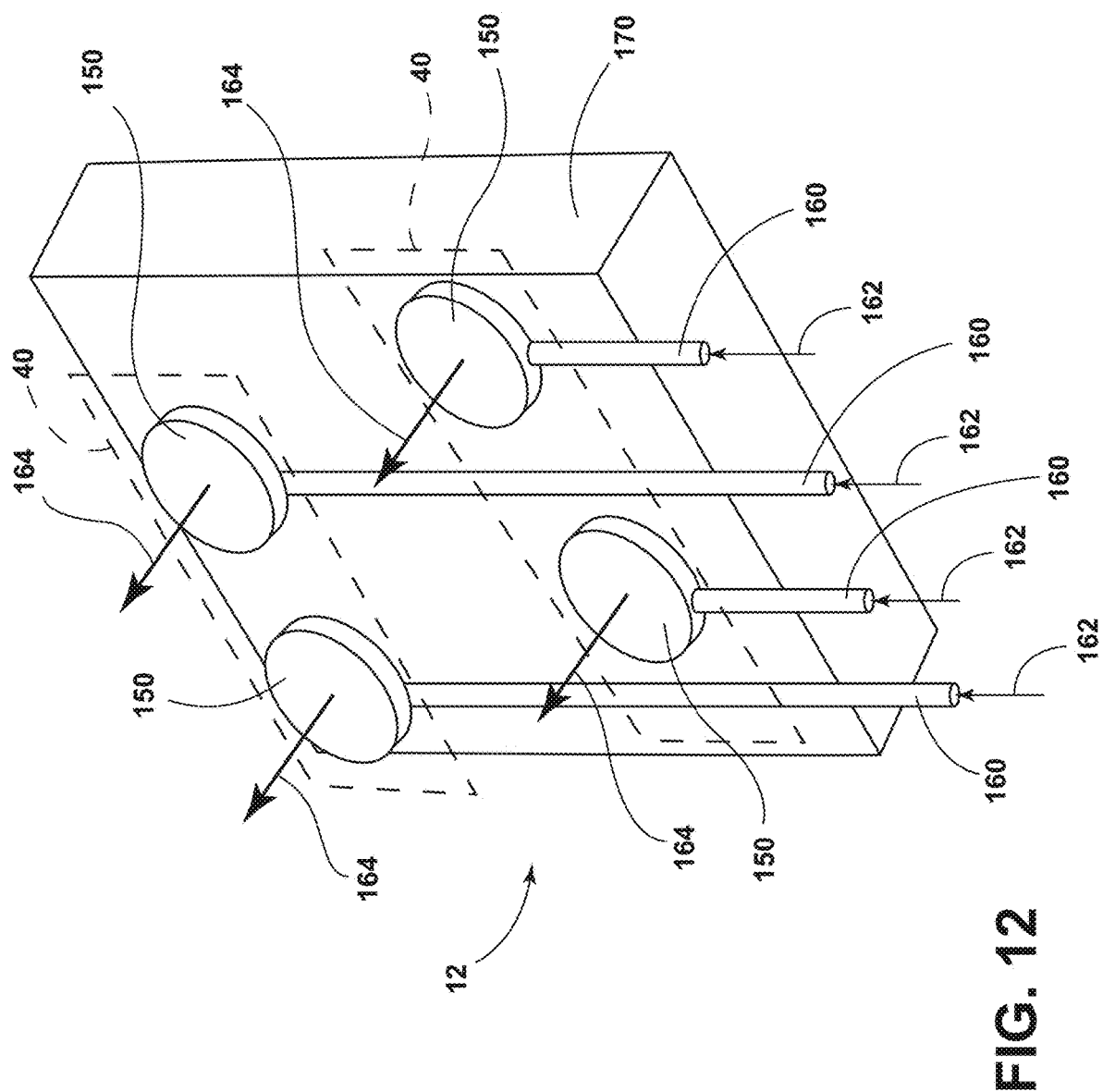
FIG. 12 is a schematic view of an arrangement of tubes and holders proximate base support foam wherein one holder is coupled to one tube of an aspect of the present disclosure.

Referring to FIG. 12, a fluid transfer member 12 with conduits 160 and holders 150 is shown. Pressurized fluid enters the conduits 160 at arrows 162, and pressurized, chilled fluid exits the conduits 160 proximate holders 150 at arrows 164. In the depicted aspect, the conduits 160 and the holders 150 are arranged along the seating surface to cool the occupant at cooling zones 40 according to occupant physiology. In various aspects, conduits 160 may be referred to as tubes.

Figure 13:
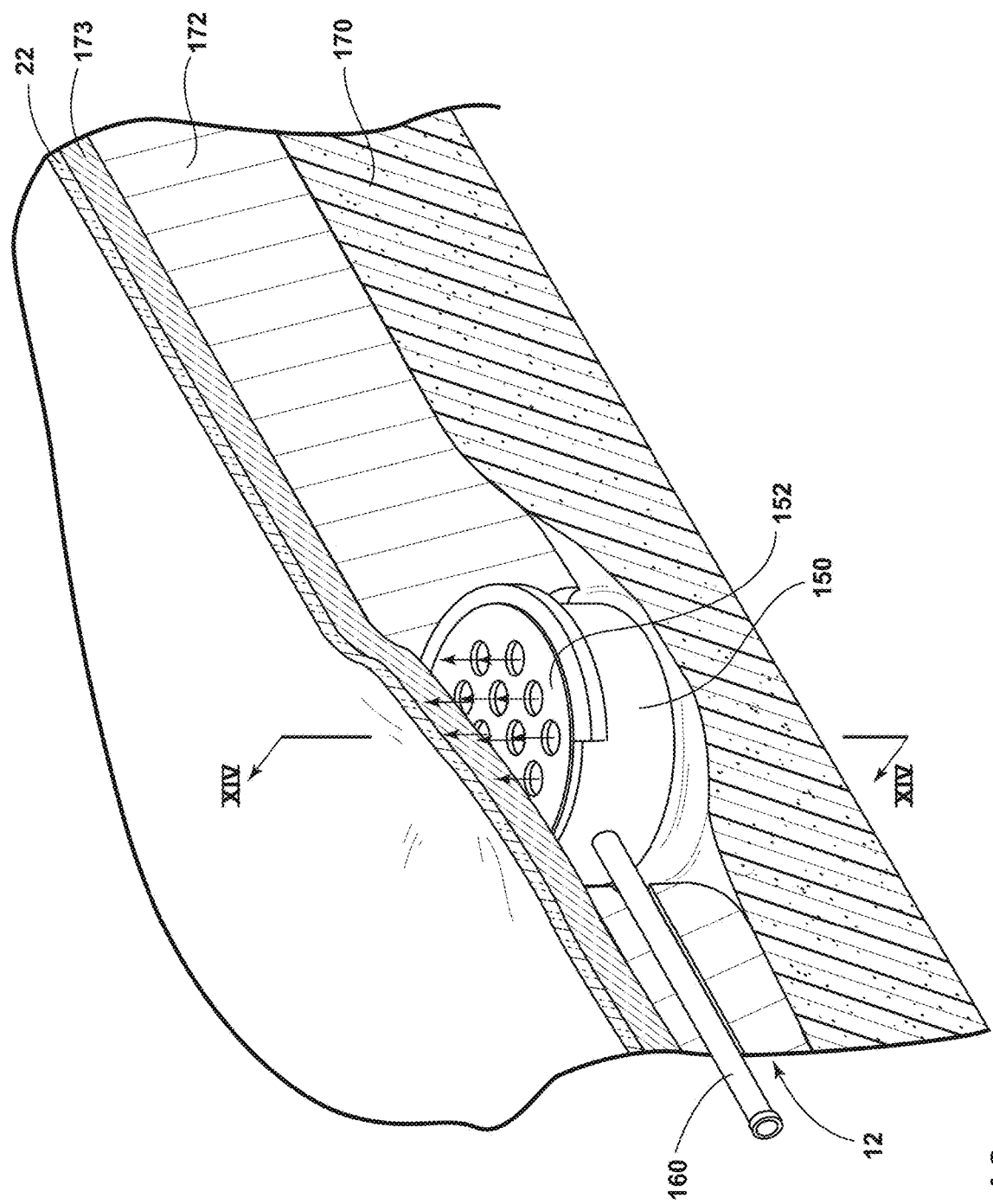
FIG. 13 is a cutaway perspective view of a tube and a holder in a cushion.
Figure 14:
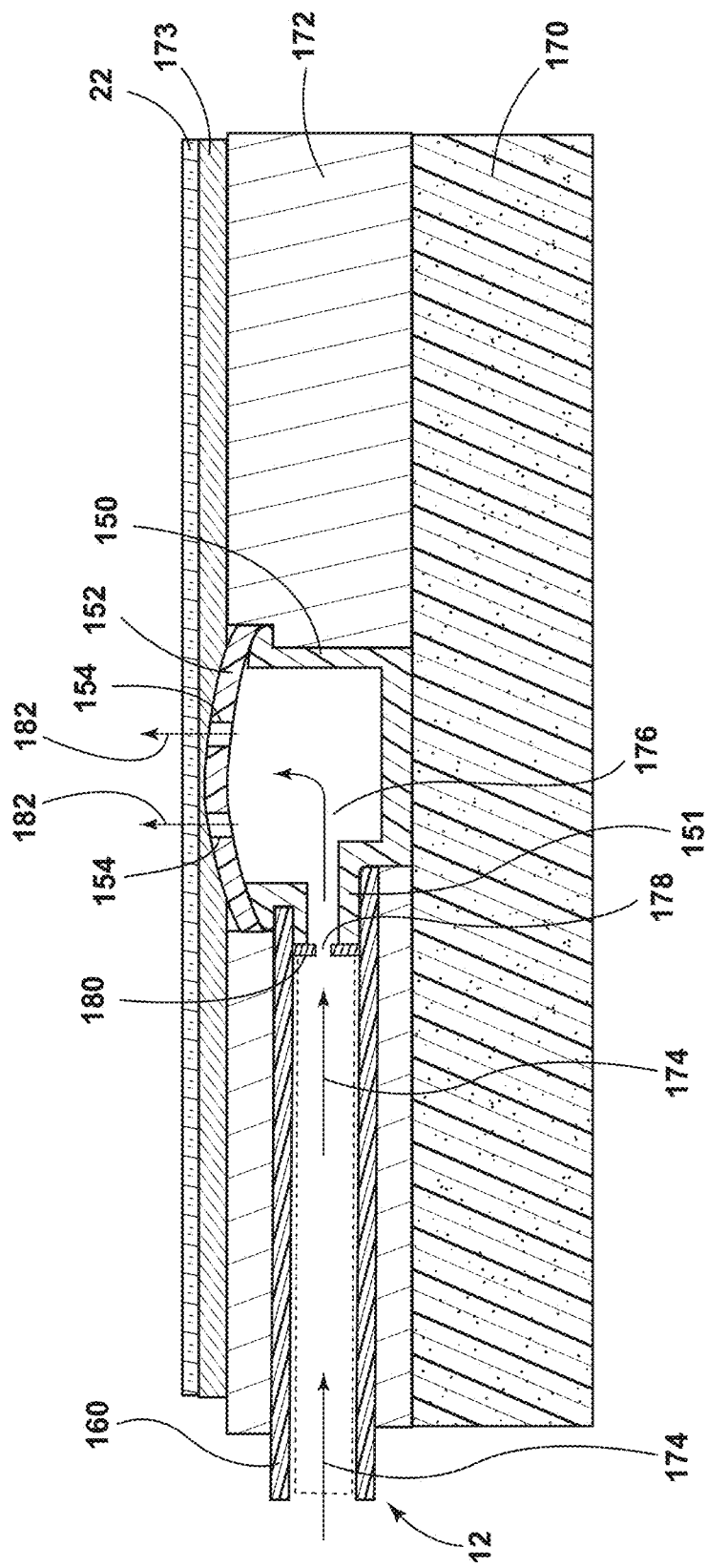
FIG. 14 is a cross-sectional view of a tube and a holder taken along line XIV-XIV of FIG. 13.

Referring to FIGS. 13-14, the holder 150 is shown between the base support foam 170 and the permeable topper pad 173 and within the carrier 172. In various aspects, the carrier 172 is flexible. A conduit 160 enters the holder 150. The holder 150 may be integrated into a fluid transfer member 12. In the depicted aspect, the holder 150 and the conduit 160 are nested in the carrier 172. The topper pad 173 overlays the carrier 172 and the cap 152 and is proximate the trim cover 22. The trim cover 22 is generally or locally perforated. The conduit 160 is coupled to the holder 150 and provides air flow into the holder 150 at arrows 174. The pressurized air at arrow 176 is released from the conduit outlet 178 into the holder 150. In various aspects, the conduit outlet 178 includes a pressure maintaining exit flow restriction 180 which may be a metered vent. The cool air at arrows 182 leaves the holder through the openings 154 in the cap 152. The cool air at arrows 182 travels through the permeable topper pad 173 and the trim cover 22. The pressurized air typically penetrates an occupant's clothing and cools the occupant's skin.

Figure 15:
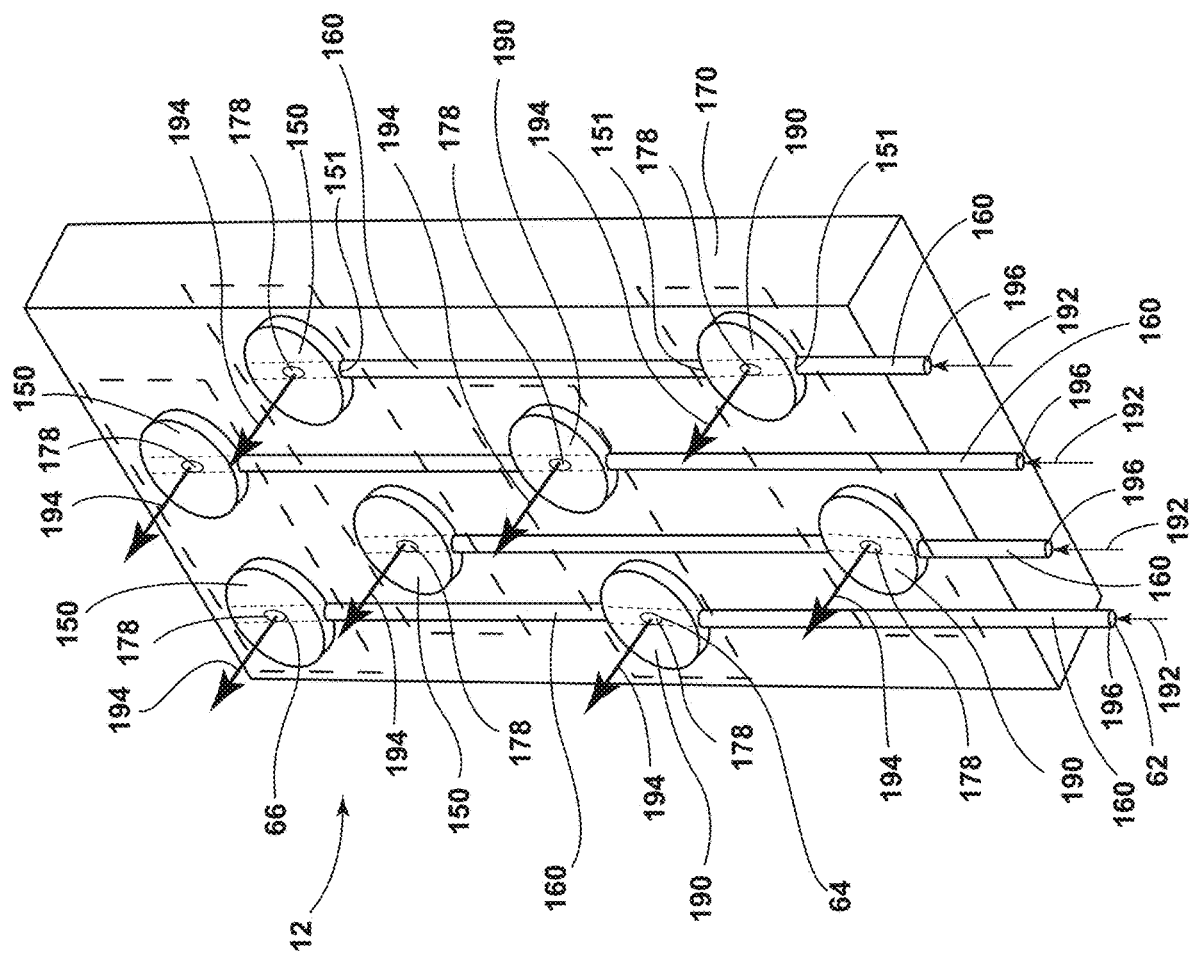
FIG. 15 is a schematic view of an arrangement of tubes and holders proximate base support foam wherein two holders are coupled to one tube of an aspect of the present disclosure.

Referring to FIG. 15, holders 150 and 190 are arranged in series along conduits 160 on a base support foam 170. In various aspects, holder 150 has one orifice 151, and holder 190 has two orifices 151. Arrows 192 depict the flow of fluid into the conduits 160. Arrows 194 depict the flow of fluid out of the holders 150 and 190. In the depicted aspect, each conduit 160 includes conduit inlet 196 and two conduit outlets 178. The flow at arrows 192 into the conduits 160 is pressurized sufficiently to allow for pressurized cooling airflow release from conduit outlets 178 to penetrate an occupant's clothing to cool the occupant.

Figure 16:
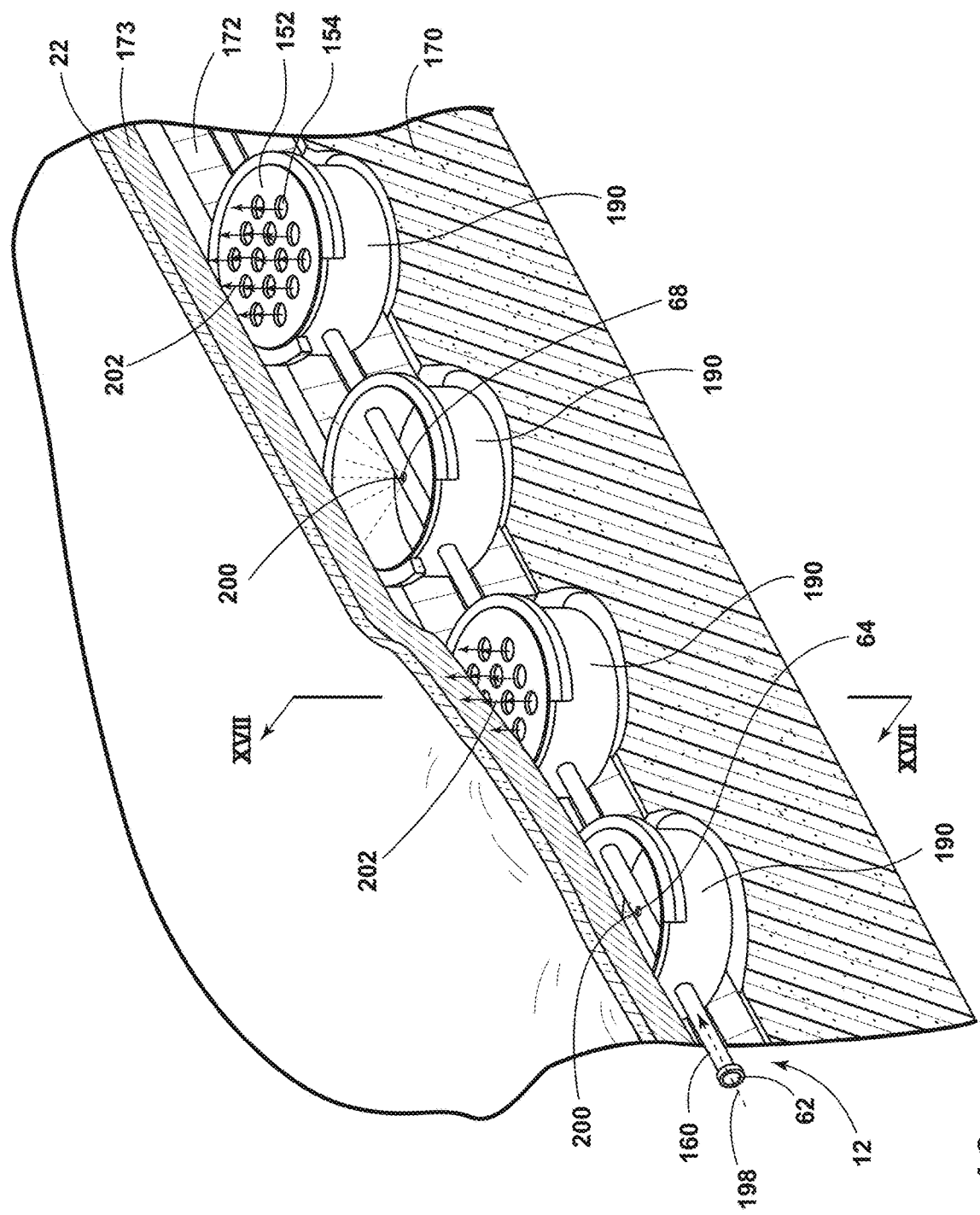
FIG. 16 is a cutaway perspective view of holders in series along a tube of an aspect of the present disclosure.
Figure 17:
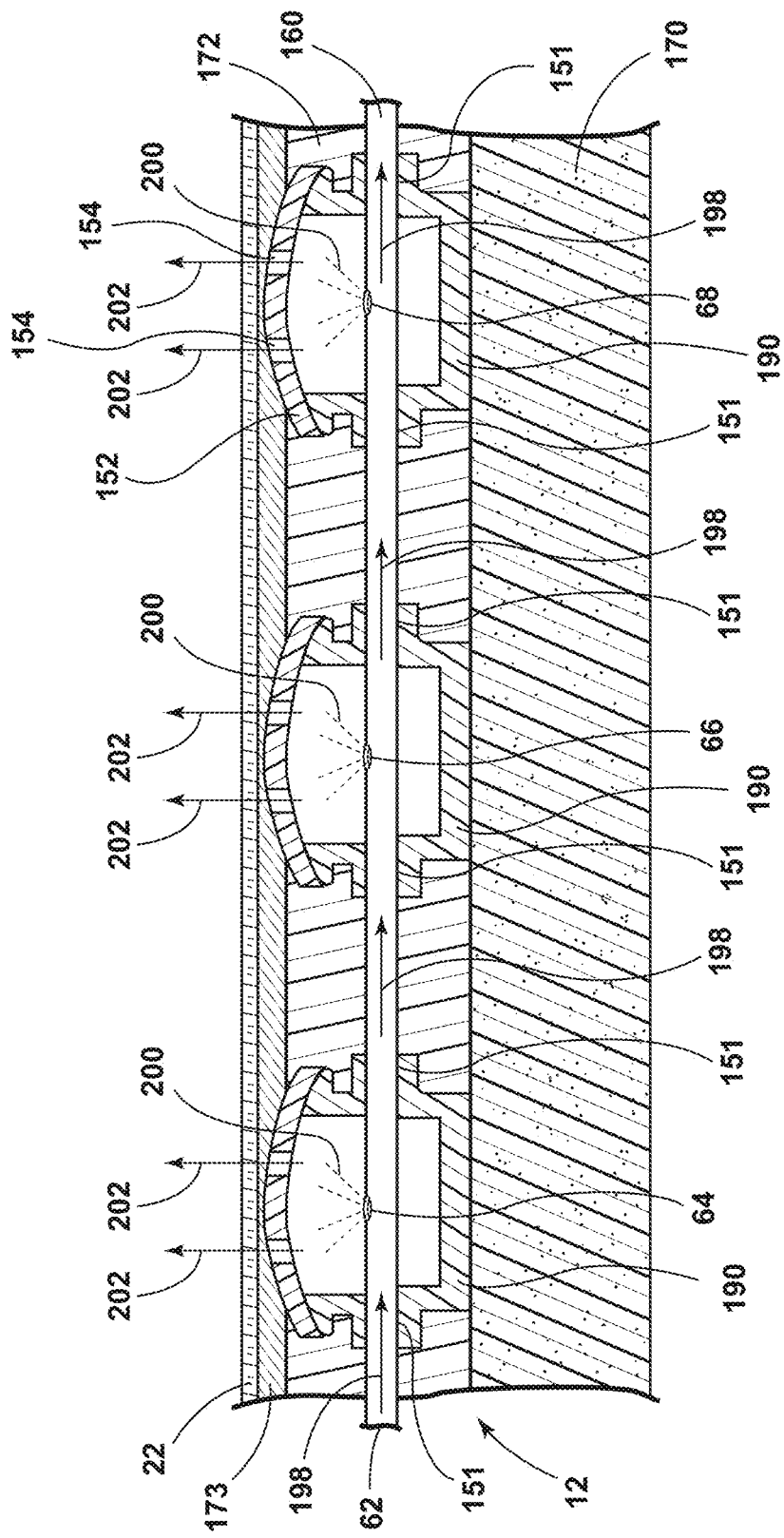
FIG. 17 is a cross-sectional view of holders in series along a tube taken along line XVII-XVII of FIG. 16.

Referring to FIGS. 16-17, holders 190 and conduit 160 are nested in the carrier 172. In the depicted aspects, the holders 190 surround the conduit 160 in a sleeve-like configuration. The conduit 160 is run through the orifices 151 of the holders 190. Airflow arrows 198 travel through the conduit 160. Pressurized cool air jets 200 leave the conduit 160 at second aperture 64, third aperture 66, and fourth aperture 68. Airflow arrows 202 leave the cap 152 openings 154 and deliver pressurized cool air through the topper pad 173 and trim cover 22.

In various aspects of the disclosure, a valve or a porous plug may be utilized at a tube outlet aperture to maintain the fluid pressure within the tube until the pressurized fluid leaves the tube.

In various aspects of the disclosure, the fluid transfer member may extend to the headrest or other seating assembly areas such as armrests in a captain's chair, bolsters, and other seating assembly areas. In various aspects of the disclosure, cooling zones may be present in the headrest or other seating assembly areas such as armrests in a captain's chair, bolsters, and other seating assembly areas.

In various aspects of the disclosure, the fluid transfer member is selectively operable to utilize one or more of the fluid transfer member first portion and the fluid transfer member second portion.

In various aspects of the disclosure, the fluid transfer member first portion may include one or more panels. In various aspects of the disclosure, the fluid transfer member second portion may include one or more panels.

In various aspects of the disclosure, a flat faced plug with a metered hole through it is at the tube outlet aperture. A hole may be created in the tube during a molding process. Alternatively, the hole may be created by (1) thermoclosing the end of the tube or using a self-welding thermoplastic; (2) waiting for the tube to cure; or (3) puncturing the tube with a laser.

In various aspects of the disclosure, the fluid mover may be a small air pump located beneath the seating assembly and coupled to the tube. In various aspects, an occupant's temperature is input that directs the selective operation of cooling (on and off) and modulates the fluid mover output. In various aspects, the metered vent measures the output temperature, pressure, flow rate, or other variable.

In various aspects of the disclosure, the trim cover may be a cloth that breathes or a perforated vinyl or leather.

In various aspects of the disclosure, a tube may have more than one inlet to deliver pressurized fluid into the tube.

In various aspects of the disclosure, the seating assembly may be used in cars, trucks, buses, trains, aircraft, boats, autonomous vehicles, and other vehicles.

In various aspects of the disclosure, the seating assembly may be used in homes and the medical industry.

The pressurized cool air delivery in a seating assembly is also disclosed in co-pending, commonly assigned to Ford Global Technologies, LLC applications 83832541, U.S. patent application Ser. No. 15/689,323, which was filed on Aug. 29, 2017—Seating Assembly with Thermoelectric Devices, now U.S. Pat. No. 10,507,745, issued Dec. 17, 2019, and 83837968, U.S. patent application Ser. No. 15/689,325, which was filed Aug. 29, 2017—Seating Assembly with Heating and Cooling, now U.S. Pat. No. 10,252,652, issued Apr. 9, 2019, the entire disclosures of each of which are hereby incorporated herein by reference in their entireties.

A variety of advantages may be derived from the use of the present disclosure. A direct, through seat cover air cooling of the occupant is achieved by dropping the temperature of an air supply while retaining some residual pressure to infiltrate the occupant's clothing. An occupant may be cooled quickly or strongly with a chilled air supply that is brought directly into contact with the occupant. An air supply is released immediately beneath the seat trim cover so that it is close to the occupant and thus able to have the air supply's residual pressure infiltrate the occupant's clothing. The fluid transfer member may be designed to cool various occupant cooling zones. For example, more economical applications may require fewer cooling zones while more expensive applications require more cooling zones. Cooling zone selection may also be based on an occupant's size, anticipated vehicle use, vehicle climate, and other factors. The size and location of the fluid transfer member may be selected based on vehicle needs.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seating surface; and
   a fluid transfer member including:
      a plurality of galleries having:
         fluid inlet portions in communication with a fluid mover; and
         fluid outlet portions including metered vents located proximate the seating surface, wherein the fluid mover is selectively operable to release a pressurized fluid through the plurality of galleries so that a release of the pressurized fluid at the fluid outlet portions including metered vents produces a temperature reduction to cool the seating surface.

2. The vehicle seating assembly of claim 1, wherein the fluid outlet portions including metered vents include diameters of approximately 0.2 mm to approximately 0.6 mm.

3. The vehicle seating assembly of claim 1, wherein the pressurized fluid includes air and wherein the temperature reduction includes a temperature reduction of the air due to a Joule-Thomson effect on the air due to the release of the air through the fluid outlet portions including metered vents.

4. The vehicle seating assembly of claim 1, wherein the pressurized fluid includes air and wherein the temperature reduction includes an adiabatic temperature reduction of the air due to the release of the air though the fluid outlet portions including metered vents.

5. The vehicle seating assembly of claim 1, wherein the seating surface extends over a seat and wherein the fluid inlet portions are at a downward facing portion of the seat and the fluid outlet portions including metered vents are at an upward facing portion of the seat.

6. The vehicle seating assembly of claim 1, wherein the seating surface extends over a seatback and wherein the fluid inlet portions are at a rearward facing portion of the seatback and the fluid outlet portions including metered vents are at a forward facing portion of the seatback.

7. The vehicle seating assembly of claim 1, wherein the plurality of galleries is integral to a seat trim cover proximate the seating surface.

* * * * *